(12) United States Patent
Fan

(10) Patent No.: US 8,125,522 B2
(45) Date of Patent: Feb. 28, 2012

(54) SPURIOUS MOTION FILTER

(75) Inventor: Zhe Fan, Lawrenceville, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 1378 days.

(21) Appl. No.: 11/689,070

(22) Filed: Mar. 21, 2007

(65) Prior Publication Data

US 2007/0223596 A1 Sep. 27, 2007

Related U.S. Application Data

(60) Provisional application No. 60/743,760, filed on Mar. 24, 2006.

(51) Int. Cl.
*H04N 7/18* (2006.01)
(52) U.S. Cl. ........ 348/155; 348/135; 348/143; 348/153; 348/154
(58) Field of Classification Search ........... 348/135, 348/143, 152–155, 161, 169, 172
See application file for complete search history.

(56) References Cited

U.S. PATENT DOCUMENTS

| | | | |
|---|---|---|---|
| 4,352,126 A | 9/1982 | Poncin et al. | |
| 4,737,847 A | 4/1988 | Araki et al. | |
| 6,298,144 B1 * | 10/2001 | Pucker et al. | 382/103 |
| 7,463,788 B2 * | 12/2008 | Kameyama | 382/284 |
| 7,554,611 B2 * | 6/2009 | Zhou et al. | 348/701 |
| 7,561,621 B2 * | 7/2009 | Itoh et al. | 375/240.16 |
| 7,751,649 B2 * | 7/2010 | Kameyama | 382/284 |
| 7,936,824 B2 * | 5/2011 | Lee | 375/240.19 |
| 2002/0071034 A1 | 6/2002 | Ito et al. | |
| 2002/0180870 A1 | 12/2002 | Chen | |
| 2005/0134745 A1 * | 6/2005 | Bacche et al. | 348/702 |

FOREIGN PATENT DOCUMENTS

| | | |
|---|---|---|
| EP | 1383085 | 1/2004 |
| EP | 1383085 A2 | 1/2004 |
| EP | 1631073 | 3/2006 |
| EP | 1631073 A2 | 3/2006 |
| GB | 2343318 | 5/2000 |
| GB | 2343318 A | 5/2000 |

OTHER PUBLICATIONS

Wei Shuifeng et al., "An Improved Method of Motion Detection Based on Temporal Difference", Journal of Nanchang Institute of Aeronautical Technology (Natural Science), Sep. 30, 2005, vol. 19, No. 3, pp. 15-19.
International Search Report including Notification of Transmittal of the International Search Report, International Search Report and Written Opinion of the International Searching Authority (200705980WO).

* cited by examiner

*Primary Examiner* — Joseph Avellino
*Assistant Examiner* — Aftab Nasir Khan

(57) ABSTRACT

A filter for filtering out spurious motion from a sequence of video images, for use in video image signal processing to identify objects in motion in the sequence of video images. Spurious motion is chaotic, repetitive, jittering portions of an image that constitute noise and interfere with motion detection in video signals. The filter keeps track of the location and the strengths of spurious motion, applies appropriate low pass filtering strengths according to the spurious motion strengths in real-time. Regular pixels without spurious motion will pass through the filter unaltered, while pixels with spurious motion will be "smoothed" to avoid being detected as noise.

18 Claims, 9 Drawing Sheets

BLUE

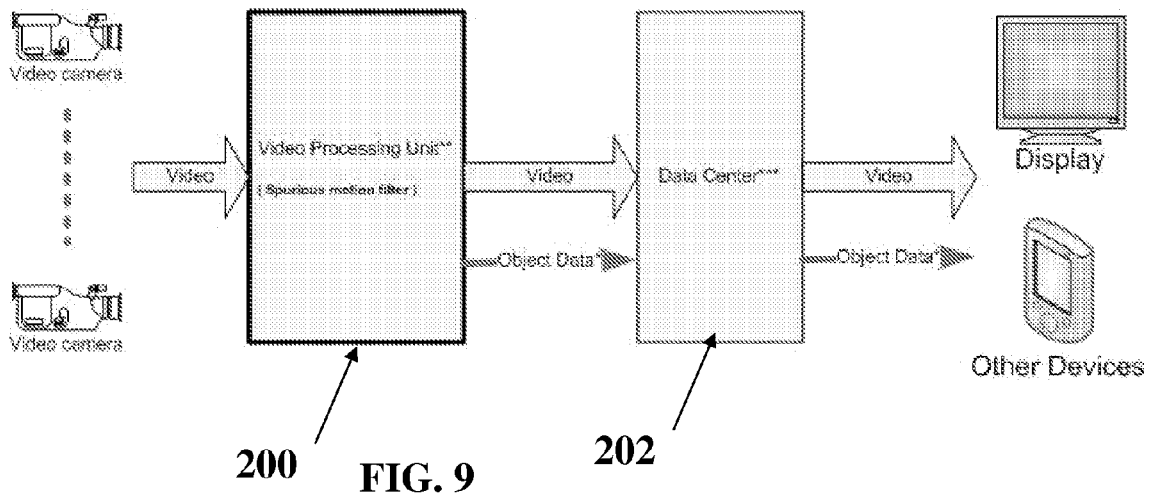
200  FIG. 9  202
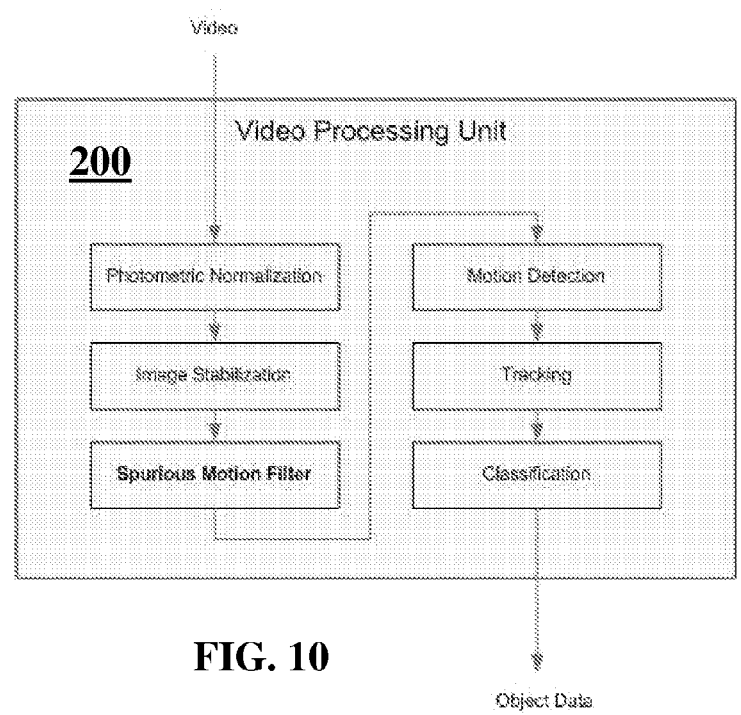
FIG. 10

SPURIOUS MOTION FILTER

STATEMENT OF RELATED CASES

This application claims the benefit of and priority to U.S. Provisional Application No. 60/743,760 filed Mar. 24, 2006, which is incorporated herein by reference.

BACKGROUND OF THE INVENTION

Wren etc. proposed a method based on decomposing the temporal signals at each pixel using digital fourier transform or digital cosine transform to extract periodicity information from the underlying spurious motions. See, Wren, C. R.; Porikli, F., "Waviz: Spectral Similarity for Object Detection", *IEEE International Workshop on Performance Evaluation of Tracking & Surveillance*, January 2005 and Porikli, F.; Wren, C. R., "Change Detection by Frequency Decomposition: Wave-Back", *Workshop on Image Analysis for Multimedia Interactive Services*, April 2005. If the current frequency signatures are quite different from a model modeling the background frequency signatures, the current pixel is classified as a foreground pixel. These two methods are actually a one-step motion detection method while our filter is designed to smooth out the spurious motion only. One dilemma these two methods face is that they require a fixed window size for the DFT or DCT function. Choosing a wide window gives better frequency resolution but poor time resolution. A narrower window gives good time resolution but poor frequency resolution. A wide window might cause long tails after the moving objects. The tails are caused by background pixels being incorrectly identified as moving pixels due to the "contamination" in the background model from pixels on the moving objects. Wren suggested to alleviate the problem by adjusting window size dynamically.

In contrast, the present invention is more adaptive in this aspect. This is because the filter strength is proportional to the spurious motion strength, and assuming regular moving objects trigger weaker spurious motion responses, which is true for most scenarios, regular moving objects will be subject to a smaller filter strength, which translates into equivalently reducing the window size of the filter. Thus, the implementation in accordance with the present invention is simpler.

There is also active research on salient motion, which detects "salience" of motion in order to separate un-salient spurious motions from salient regular motions. See, R. P. Wildes & L. Wixson, "Detecting Salient Motion Using Spatiotemporal filters and Optical Flow," *Proceedings of the DARPA Image Understanding Workshop*, 349-356, 1998. Obviously these approaches are totally different than the present invention.

Salient motion is based on optic flow technique, which is widely regarded as inaccurate and error-prone. If a pedestrian walks 3 steps forward and 2 steps backward, it is very difficult for it being regarded as salient motion. Because the approach of the present invention uses a much longer time period (comparing with typical motions) to detect spurious motion, it will be easier to detect a pedestrian. However, salient motion may hold an advantage in detecting objects in extremely noisy spurious motion areas since the approach of the present invention tends to use very strong filtering which might affect detecting regular moving objects.

So far there is no commercial application for salient motion technique to the author's best knowledge.

Accordingly, new and improved methods and systems for providing spurious filtering in surveillance systems are required.

SUMMARY OF THE INVENTION

The present invention provides systems and methods for processing video signals in a surveillance system. The method in accordance with one aspect of the present invention includes the steps of determining a measurement of the difference between two frames in the video signal, applying a threshold to the video signal and filtering the video signal with a low pass filter.

In accordance with further aspects of the present invention, the method includes generating a spurious motion map and displaying the spurious motion map.

In accordance with other aspects of the present invention, the thresholding and the filtering are adaptively controlled by a user. The video signal and a spurious motion map are generated and displayed. The threshold is adjusted in accordance with the display of the video signal and the display of the spurious motion map. A parameter in the low pass filter can also be adjusted in accordance with the display of the video signal and the display of the spurious motion map. These adjustments are made to improve the detection of the spurious signals.

The step of determining a measurement of the difference between two frames is preferably made using a differential filter.

The low pass filter is preferably implemented by $S_i = S_{i-1} \cdot (1-\alpha) + P_i \cdot \alpha$ where $S_i$ is the filtered signal in the ith frame, $P_i$ is the input on the ith frame, and $\alpha$ is a user defined parameter.

In accordance with further aspects of the present invention, the method also includes normalizing the video signal to generate a spurious motion map and dilating the spurious motion map to fill in holes. The method also includes further filtering the motion map with a low pass filter. The method further includes processing the video signal to detect motion.

A system in accordance with the present invention includes a processor that receives video signals from a surveillance system and a software application operable on the processor to perform the previously described steps.

DESCRIPTION OF THE DRAWINGS

FIGS. 9 and 10 illustrate processing units in a surveillance system in accordance with another aspect of the present invention.

DESCRIPTION OF A PREFERRED EMBODIMENT

One aspect of the present invention provides motion detection systems and methods. Other aspects of the present invention provide systems and methods related to spurious filters.

Overview of the Spurious Filter

The filter of the present invention, is designed to filter out spurious motions. Spurious motions are defined as chaotic, repetitive, jittering that are not useful in the process of motion detection when processing video signals. In accordance with one aspect of the present invention, the new spurious filter keeps track of the location and the strengths of spurious motion. It applies appropriate low pass filtering strengths according to the spurious motion strengths in real-time. Regular pixels without spurious motion go through this filter unaltered while pixels with spurious motion will be "smoothed" to avoid being detected as noise.

For most motion detection algorithms, pixel value changes from background model are detected as motion. However, many types of these motions, such as glints on water, choppy waves, flags, tree branches and grass blown by wind, are not of interest during the process of motion detections for security purposes. When feeding these video signals to a regular motion detection algorithm, a lot of noise can be generated, potentially making the detection output useless.

Figure 1:
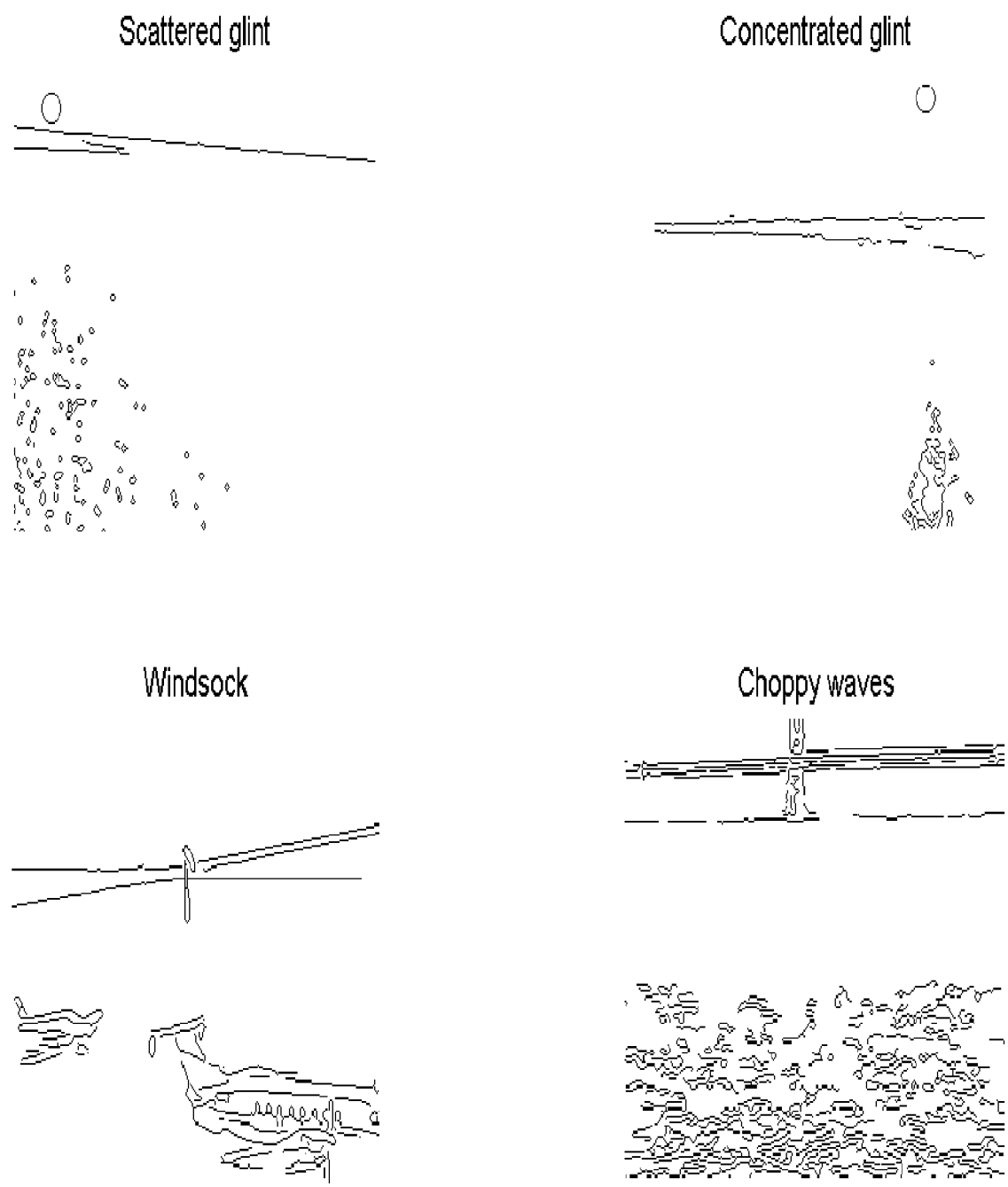
FIG. 1 illustrates typical types of spurious motion.

Because of the vast varieties of spurious motions and real-time video processing requirement, the filter of the present invention should be flexible to configure and efficient in execution. See, for example, FIG. 1 which illustrates various sources of spurious motion in surveillance systems. For example, as illustrated, sun glint, both scattered and concentrated, often create spurious motion. Further, windsock and choppy waves are also known sources of spurious motion.

In accordance with one aspect of the present invention, a representative spurious motion strength is defined and a minimum set of configuration parameters are used to cover the vast varieties of spurious motions. In accordance with a further aspect of the present invention, a systematic two-step approach that defines the scope and fixing of the problem is designed to filter out spurious motion and graphics representation for easy setup.

Tests demonstrate that the filter of the present invention is fast enough to be used in multi-channel real-time video surveillance system on a personal computer with a 3G CPU. The filter of the present invention eliminates many different kinds of spurious motions. Further regular moving objects can still be detected in reasonably filtered areas. Detection might be lost in strongly filtered areas, such as in the center of sun glint on water. Motion detection outside filtered areas, however, is not affected at all.

Overview of Motion Detection in Video Surveillance Systems

A typical video surveillance system consists of image acquisition module, motion detection module, tracking module and classification module. Image acquisition is a well established field with most of the hardware can provide satisfactory video feed for motion detection purposes.

The differences among various surveillance systems mostly come from the differences in the performance on motion detection, tracking and classification modules.

Obviously motion detection is the foundation of all the following steps. Its input is raw video from frame grabber or other video sources. Its output is a motion map indicting where the moving pixels are.

Motion is defined as pixel value differences from a reference image, a.k.a. background image. Depending on how sophisticated the reference image is modeled, one Gaussian function (background subtraction) or several Gaussian functions (multi-Gaussian) might be used. Using multiple functions to model the background will help eliminating spurious motions because it basically allows the background being in different modes, which are approximately true for background pixels with spurious motion. But experiment results show it is not adequate for handling real-life videos.

There are motion detection methods not using reference image, but relying on differencing of consecutive frames. They are widely regarded as unfit for real-life videos due to the lack of "memory" which is required for detecting temporarily stopped or slow moving objects.

Spurious Motion Filter

Figure 2:
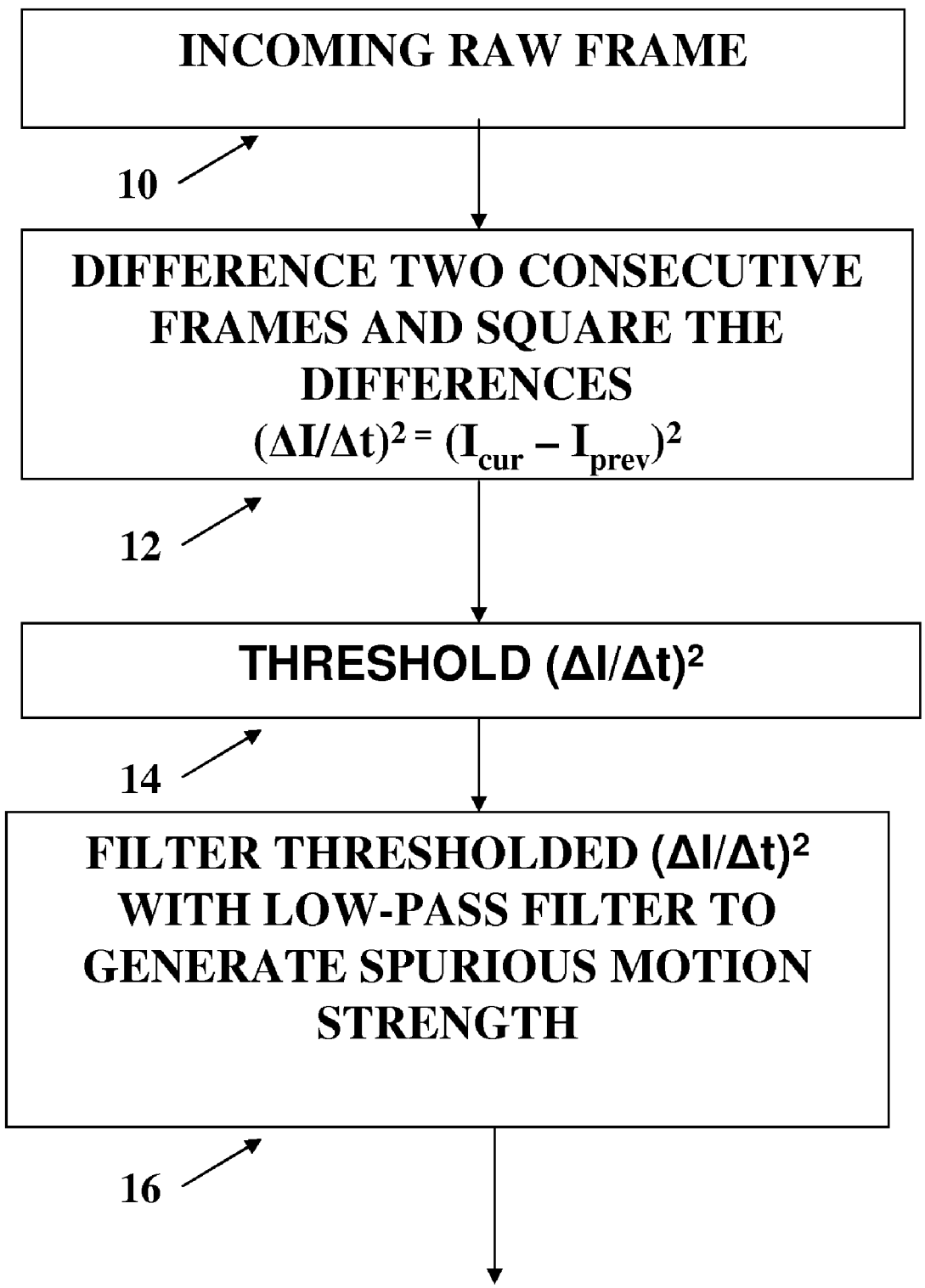
FIGS. 2 and 3 illustrates a flowchart of a method in accordance with the present invention.
Figure 3:
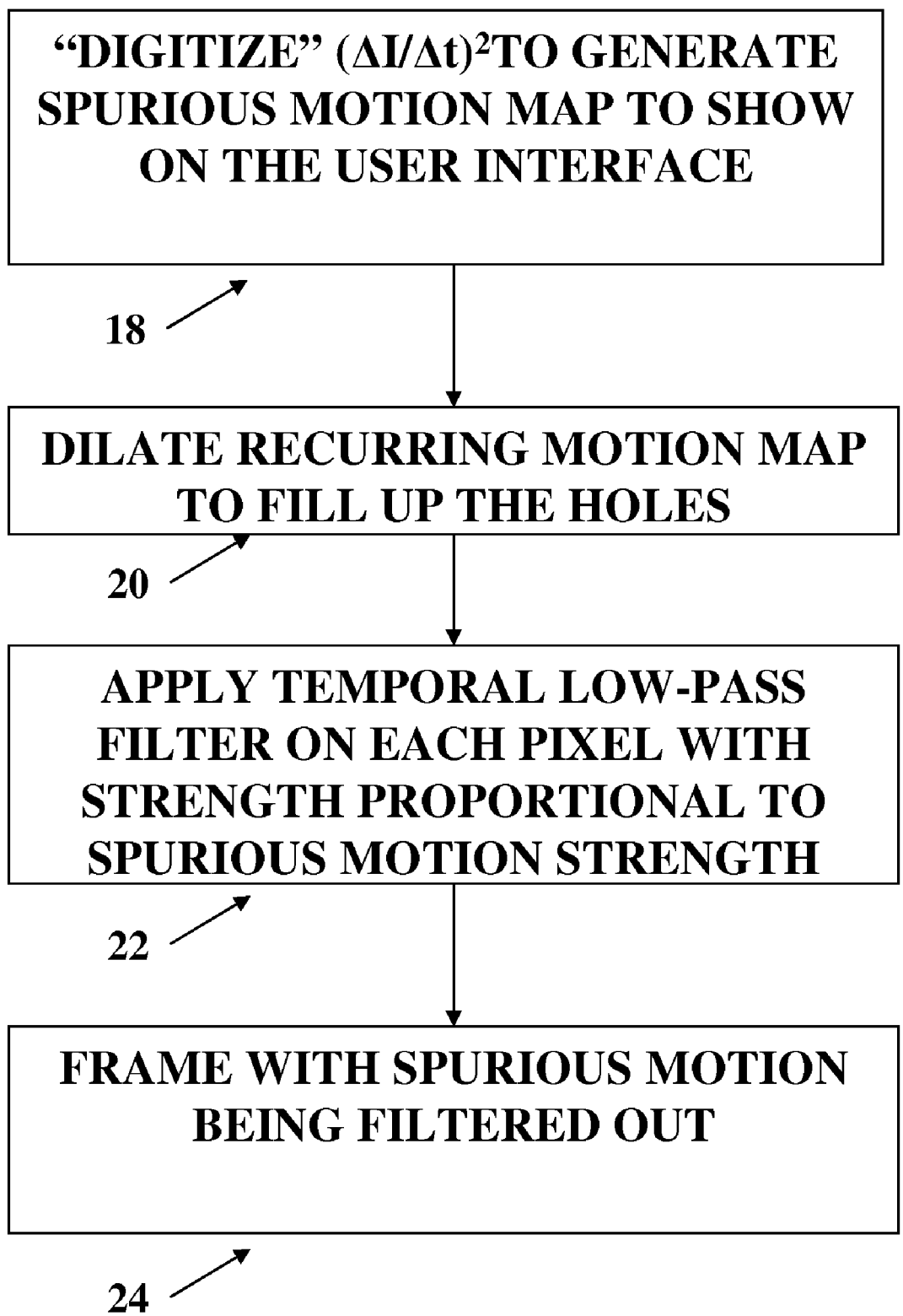
Figure 4:
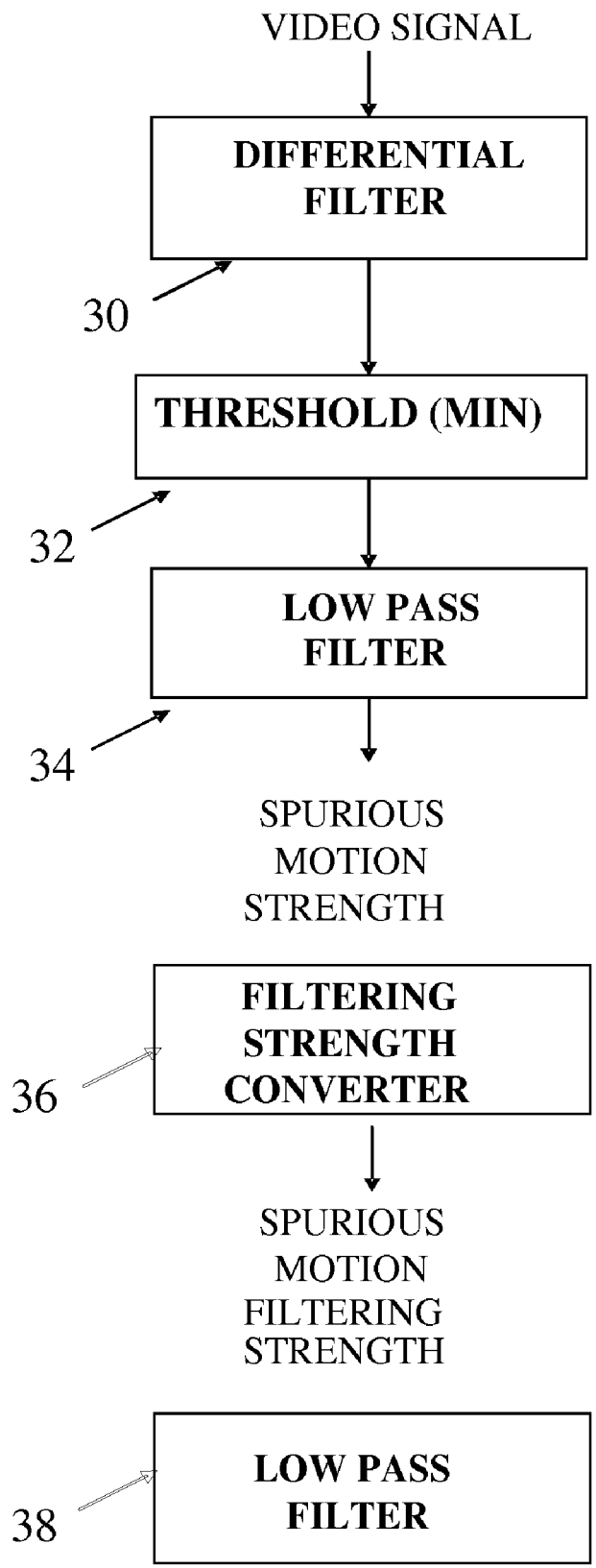
FIG. 4 illustrates another aspect of the method of generating the spurious filter in accordance with the present invention.

FIGS. 2 and 3 illustrate a flowchart of a spurious motion filter in accordance with one aspect of the present invention. FIG. 4 illustrates the components of a spurious motion filter in accordance with one aspect of a spurious motion filter in accordance with the present invention. In FIG. 4, the filter preferably includes a differential filter 30, a threshold filter 32 and a low pass filter 34. It also includes a filtering strength converter 36 and a second low pass filter 38.

Input and Output

The spurious motion filter is preferably placed at the very front of the processing pipeline. Its inputs are raw video frames 10 and its outputs, which are filtered image framed, are fed into a motion detection module. Comparing with input frames, the pixels in spurious motion areas in output frames will be much less scintillating while the pixels outside spurious motion areas are identical to the corresponding pixels in input frames.

Spurious Motion Strength

The more frequent a pixel value changes, and the larger the change is, the stronger the spurious motion is. The procedures specified herein are to capture the characteristics of spurious motions, which are consistent changes in pixel values over a long period of time.

Differential Filter

Referring to FIG. 2, a squared difference in step 12 is used to pick up the changes in the video signal. A simple differencing from two consecutive frames is carried out in step 20 of FIG. 2. To avoid sign problems and skew the output to favor spurious motion which tend to have more dramatic changes, the square of the difference is sent to the next filter. Thus, as indicated in FIG. 2, for each pixel in consecutive frames, the following calculation is determined: $(\Delta I/\Delta t)2 = (Icur - Iprev)^2$ While it is preferred to use a differential filter to extract "changes" in video signals, it is not necessary. Thus, the calculation just specified can be performed with any filters or procedures that can detect changes between the frame history and the current frame.

Minimum Thresholding

To void including video noise into consideration of building spurious motion strength, the output from differential filter is thresholded from the bottom, as illustrated in step 14 of FIG. 2. Thus, any of the differential values that are below a threshold are excluded during this step. Typically the threshold should be large enough to prevent high contrast areas in the image from being included into spurious motion areas. Due to image noise, high contrast area is more likely to appear as spurious motion than areas with average contrast.

Low Pass Filter

One key difference between spurious motion signal and regular motion signal is that spurious motion lasts much longer from a particular pixel perspective. Regular motion will also induce some responses on spurious motion. But because it is more transient, it is less likely for the spurious motion strength to rise to a level affecting motion detection. Thus, the processed signal is low pass filtered in step 16 in FIG. 2 after thresholding. This low pass filter is the key step in separating spurious motions from regular motions in term of spurious motion strength.

A simple but effective implementation of a low pass filter is $$S_i = S_{i-1} \cdot (1-\alpha) + P_i \cdot \alpha$$

where $S_i$ is the filtered signal in the ith frame, $P_i$ is the input on the ith frame, $\alpha$ is defined as spurious motion learning rate. It should reflect the temporal characteristics of the spurious motion signal to be filtered. The higher the spurious motion frequency, the larger this learning rate should be. For a general-purpose spurious motion filter, 0.1 is a good starting value for the learning rate.

It is preferred that the spurious motion filtering be adaptive to allow users to improve the results adaptively. Thus, in accordance with another aspect of the present invention, the threshold used in step 14 can be adaptively changed by a user. Additionally, the value $\alpha$ used in the filtering step 16 can also be adaptively changed by a user.

Figure 5:
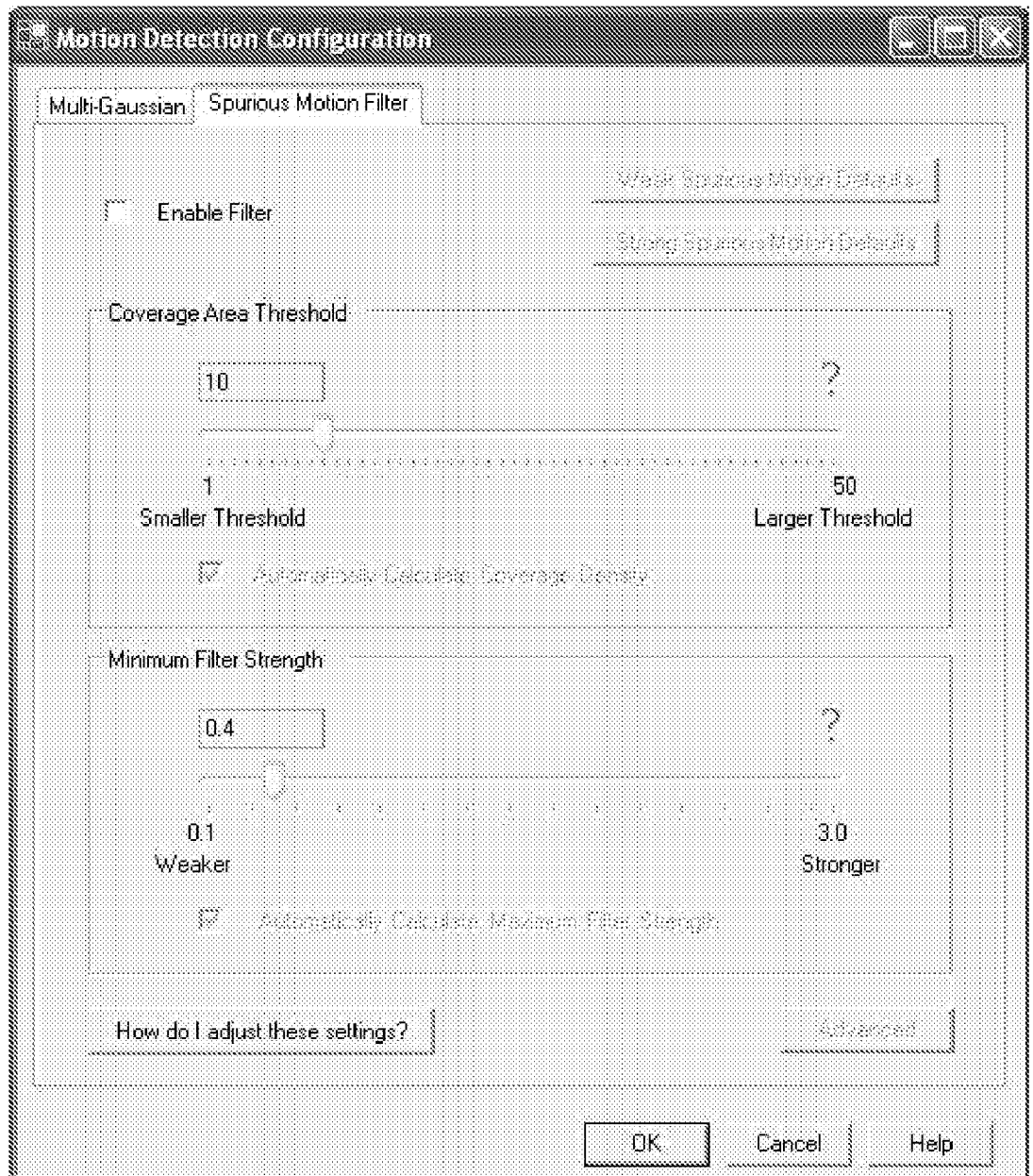
FIG. 5 illustrates a window that allows a user to configure motion detection parameters in the spurious filter in accordance with various aspects of the present invention.

FIG. 5 illustrates a window displayed by a processing system in the surveillance system that allows users to specify the threshold value in step 14 and the value of $\alpha$ in step 16. A user can adjust the slider bar in the Coverage Area Threshold section of the window to adjust the threshold value used by a processor to process the video signals. The user can also adjust the slider bar in the Minimum Filter Strength Area of the window to adjust the value of $\alpha$. The user can adjust these values while viewing a spurious motion map and adjusts the values until a desirable picture is obtained.

Spurious Motion Map

In step 18 of FIG. 3, a spurious motion map is generated, preferably by normalizing the signal strength of the video signal. In step 20, the motion map is dilated to fill up holes in the spurious motion map. The motion map can be dislated by a binary method or by a grayscale method. It is preferred to use the grayscale method in the present invention. In step 22, a low pass filter is applied. It step 24, the frames of the video signal with the spurious motion filtered out is displayed.

The spurious motion map is an image of the spurious motion strengths at each pixel. Its pixel value should reflect the spurious motion strength For example, if we use blue color to indict the existence of spurious motion, the bluer a pixel is, the stronger the spurious motion is at that pixel. In order to map the spurious motion strengths into the saturation value of a particular color, a linear scale can be used with the least saturated color corresponds to the threshold for spurious motion strength and the most saturated color corresponds to the maximum spurious motion strength, which can be a pre-defined value. The slope of this linear scale will dictate the distribution of color shades within the regions with spurious motions.

In order to simplify setup procedure, the maximum spurious motion strength threshold can be calculated automatically from the minimum spurious motion strength threshold by using a pre-defined simple linear relationship between the extremes of the spurious motion strength thresholds. In practice, the impact of maximum is much less obvious than the impact from the minimum.

It is also recommended to superimpose the spurious motion map onto a live video image to show visually the filter coverage and motion strength distribution in real-time. When setting up the spurious motion filter, user needs to indict to the system the scope the filter needs to cover by adjusting threshold for spurious motion strength. When the threshold is very low, the normal noise on the video signal might be considered as spurious motion; when the threshold is very high, real spurious motions might be missed out. The same type of motions might be considered as spurious motion in one scenario while being considered as normal motion in another scenario. Therefore, it is important for a user to have some visual feedback when defining the scope the spurious motion should work in.

Patterns of Spurious Motion

There are all sorts of spurious motions in nature. From a particular pixel perspective, it can be very dramatic change but happens infrequently, such as glint on water; or very gradual changes but happens constantly, such as grass blown by wind. The first case is especially difficult to filter out because of the similarity to the signals of normal moving objects. Therefore, a dilation operation is necessary on the spurious motion map to obtain a stable response. The combined effect of low-pass filtering and dilation on spurious motion strengths achieves a smoothing effect in 3D spatiotemporal space. The kernel of the dilation should be proportional to the size of the typical distances among the spikes in the spurious motion area.

Filtering Spurious Motion

Given the spurious motion strength, it is possible to apply appropriate filtering strengths to various levels of spurious motions. For example, the spurious motion with strength equals to the spurious motion strength threshold should be subject to the minimum filtering strength while the spurious motions with strengths equal or above the maximum spurious motion strength threshold should be subject to the maximum filtering strength. The minimum and the maximum filtering strengths are set by users. Since spurious motion filter most likely precedes a motion detection module, it is helpful watching the motion detection results when setting the min and max of filtering strengths. The typical values for the minimum and maximum filtering strengths are within (0,1) and (1,10) respectively.

At the step 22, the invention feeds each pixel in the current raw video frame into a low-pass filter whose strength is controlled by the spurious motion strength at that pixel.

The low pass filter used in step 22 is preferably similar to one used in obtaining spurious motion strength:

$$S_i = S_{i-1} \cdot (1-\alpha) + P_i \cdot \alpha$$

where $\alpha$ is tied to the spurious motion strength using the following formula. $\alpha = \exp(-S_{sm})$ where $S_{sm}$ is the spurious motion strength at that pixel. This particular function gives an approximately linear scale in picking filter strength against spurious motion strength.

Similar to the procedure for minimum and maximum spurious motion strengths, the maximum spurious motion filtering strength can be calculated automatically from the minimum spurious motion filtering strength. Using a pre-defined simple linear relationship between the extremes of the spurious motion filtering strength proves to be adequate from experiences. In practice, the impact of maximum is much less obvious than the impact from the minimum.

In accordance with one aspect of the present invention, the proposed scheme is independent from various implementations of low pass filter and differential filters. It is preferred to generate a spurious motion map to effectively set up a filter in accordance with one aspect of the present invention. It is, however, not necessary to generate the map in a particular way as long as the pixel values reflect the spurious motion strength.

Figure 6:
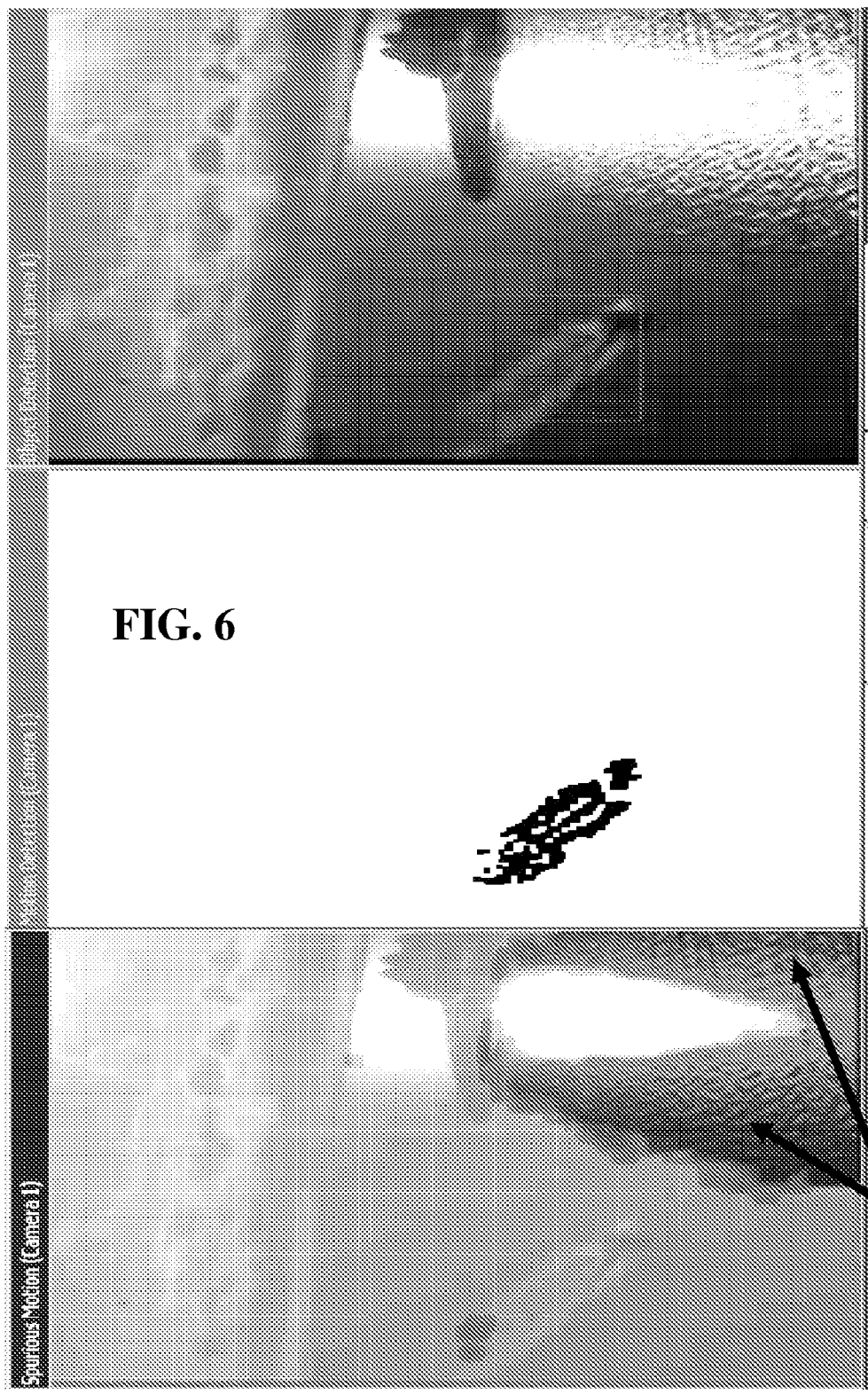
FIGS. 6 and 7 illustrate typical windows that a user of a system of the present invention can use.
Figure 7:
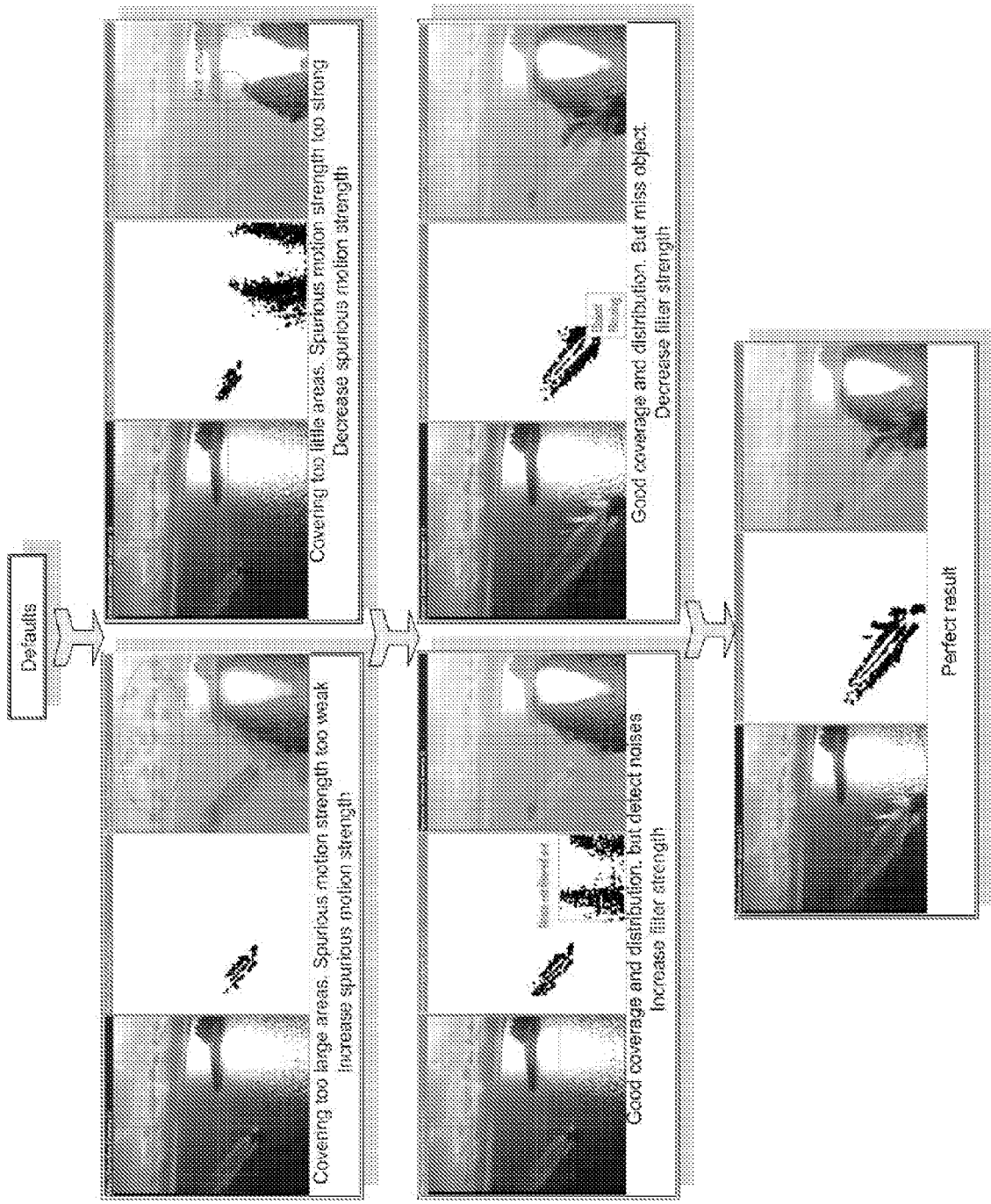

FIGS. 6 and 7 illustrate three windows which the system of the present invention displays to a user. In each sequence of windows, the left window shows a spurious motion. The center window shows motion detection and the right window shows the video signal.

In FIG. 6, in the left window, the darker area surrounding the white section represents ripples and spurious motion. In the present invention, it is represented as blue. After viewing the windows, the user adjusts the sliders in the window illustrated in FIG. 5 to adjust the threshold and the low pass filter parameter to improve the detection of the spurious signals, as illustrated in the windows of FIGS. 6 and 7.

Figure 8:
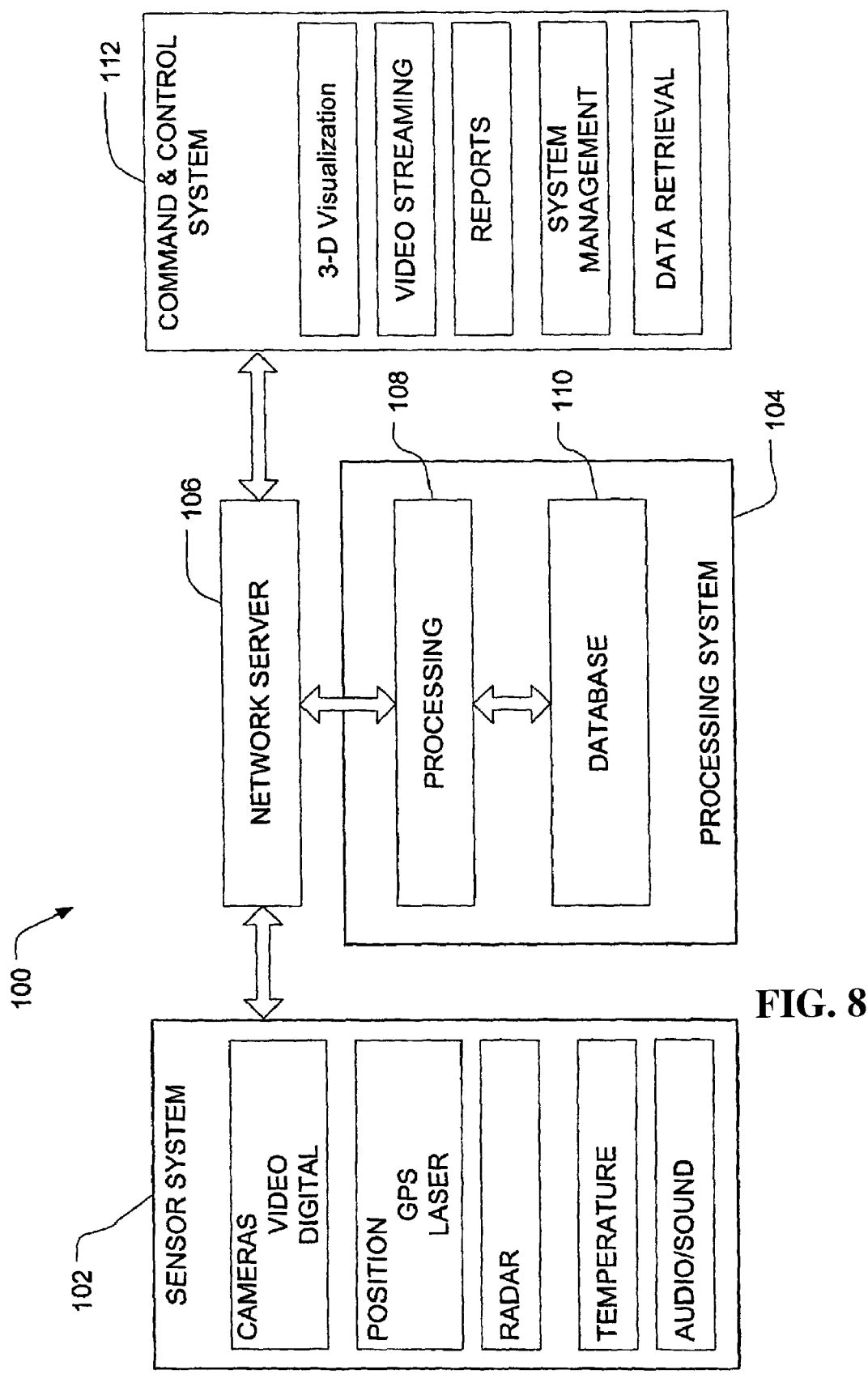
FIG. 8 illustrates a surveillance system in accordance with one aspect of the present invention.

The present invention has applicability in surveillance systems and processing systems for surveillance purposes, and can be used in a wide range of such systems. For illustration purposes, such a system is illustrated in FIG. 8. Referring to FIG. 8, a surveillance system 100, in accordance with one aspect of the present invention, can include a sensor system 102, a network server 106, a processing system 104 and a command and control system 112. The processing system 104 includes a processing subsystem 108 and a database 110. It also includes application software that is operable on the processing system 104 to perform the steps described herein. The processing of the present invention is preferably performed in the processing subsystem 108, which also performs other known processing of video signals from a surveillance system.

FIGS. 9 and 10 illustrate a video processing unit in accordance with another aspect of the present invention. Video is fed to a video processing unit 200, which feeds a data storage center 202. The data storage center 202 can drive various displays and devices. Referring to FIG. 10, the video processing unit 200 includes a normalization module, a stabilization module, and the spurious motion filter of the present invention. As illustrated in FIG. 10, the spurious motion filter receives stabilized video data from the stabilization module. The output from the spurious motion filter is fed to the motion detection module, which feeds the tracking module and the classification module. Thus, the video processing unit 200 includes a processor and application software that implements each of the modules illustrated in FIG. 10, including the spurious motion filter, as described herein.

The processing and filter of the present invention can be located in either a surveillance server or a surveillance client 240. These systems are described in greater detail in U.S. Pat. No. 7,106,333, which is hereby incorporated by reference.

The following references provide background information concerning the present invention, and are hereby incorporated by reference: [1] Wren, C. R.; Porikli, F., "Waviz: Spectral Similarity for Object Detection", *IEEE International Workshop on Performance Evaluation of Tracking & Surveillance*, January 2005; [2] Porikli, F.; Wren, C. R., "Change Detection by Frequency Decomposition: Wave-Back", *Workshop on Image Analysis for Multimedia Interactive Services*, April 2005; and [3] R. P. Wildes & L. Wixson, "Detecting Salient Motion Using Spatiotemporal filters and Optical Flow," *Proceedings of the DARPA Image Understanding Workshop*, 349-356, 1998.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A method of filtering a video signal in a surveillance system, comprising:
   determining a measurement of a difference between two frames in the video signal;
   applying a threshold to the video signal; and
   filtering the video signal with a low pass filter wherein the low pass filter is implemented by $S_i=S_{i-1}\cdot(1-\alpha)+P_i\cdot\alpha$ where $S_i$ is a filtered signal in the ith frame, $P_i$ is the input on the ith frame, $\alpha$ is a user defined parameter.

2. The method of claim 1, further comprising:
   generating a spurious motion map; and
   displaying the spurious motion map.

3. The method of claim 1, further comprising:
   displaying the video signal;
   generating and displaying a spurious motion map of the video signal; and
   adjusting the threshold in accordance with the display of the video signal and the display of the spurious motion map.

4. The method of claim 1, further comprising:
   displaying the video signal;
   generating and displaying a spurious motion map of the video signal; and
   adjusting a parameter in the low pass filter in accordance with the display of the video signal and the display of the spurious motion map.

5. The method of claim 1, further comprising:
   displaying the video signal;
   generating and displaying a spurious motion map of the video signal;
   adjusting the threshold in accordance with the display of the video signal and the display of the spurious motion map; and
   adjusting a parameter in the low pass filter in accordance with the display of the video signal and the display of the spurious motion map.

6. The method of claim 1, wherein the step of determining a measurement of the difference between two frames is made using a differential filter.

7. The method of claim 1, further comprising:
   normalizing the video signal to generate a spurious motion map; and
   dilating the spurious motion map to fill in holes.

8. The method of claim 7, further comprising filtering the motion map with a low pass filter.

9. The method of claim 8, further comprising processing the video signal to detect motion.

10. A surveillance system for processing a video signal, comprising:
    a processor that receives the video signal;
    a software application operable on the processor to:
    determine a measurement of a difference between two frames in the video signal;
    apply a threshold to the video signal; and
    filter the video signal with a low pass filter wherein the low pass filter is implemented by $S_i=S_{i-1}\cdot(1-\alpha)+P_i\cdot\alpha$ where $S_i$ is a filtered signal in the ith frame, $P_i$ is the input on the ith frame, $\alpha$ is a user defined parameter.

11. The system of claim 10, wherein the software application is further operable to generate a spurious motion map and display the spurious motion map.

12. The system of claim 10, wherein the software application is further operable to:
    display the video signal;
    generate and display a spurious motion map of the video signal; and
    adjust the threshold in accordance with the display of the video signal and the display of the spurious motion map.

13. The system of claim 10, wherein the software application is further operable to:
- display the video signal;
- generate and display a spurious motion map of the video signal; and
- adjust a parameter in the low pass filter in accordance with the display of the video signal and the display of the spurious motion map.

14. The system of claim 10, wherein the software application is further operable to:
- display the video signal;
- generate and display a spurious motion map of the video signal;
- adjust the threshold in accordance with the display of the video signal and the display of the spurious motion map; and
- adjust a parameter in the low pass filter in accordance with the display of the video signal and the display of the spurious motion map.

15. The system of claim 10, wherein the determination of a measurement of the difference between two frames is made using a differential filter.

16. The system of claim 10, wherein the software application is further operable to:
- normalize the video signal to generate a spurious motion map; and
- dilate the spurious motion map to fill in holes.

17. The system of claim 16, wherein the software application is further operable to filtering the motion map with a low pass filter.

18. The system of claim 17, wherein the software application is further operable to further process the video signal to detect motion.

* * * * *

UNITED STATES PATENT AND TRADEMARK OFFICE
CERTIFICATE OF CORRECTION

PATENT NO. : 8,125,522 B2  
APPLICATION NO. : 11/689070  
DATED : February 28, 2012  
INVENTOR(S) : Zhe Fan Page 1 of 1

It is certified that error appears in the above-identified patent and that said Letters Patent is hereby corrected as shown below:

On the title page in Assignee item (73); delete "Siemens Industry, Inc., Alpharetta, GA (US)" and insert -- Siemens Aktiengesellschaft, Munich (DE) --

Signed and Sealed this
Twelfth Day of June, 2012

David J. Kappos
*Director of the United States Patent and Trademark Office*